June 30, 1931.  H. H. CANNON  1,812,773
TAPERED TUBE FILTER PRESS
Filed Oct. 2, 1929    2 Sheets-Sheet 1

HUGH HARLEY CANNON
INVENTOR

ATTORNEY

HUGH HARLEY CANNON
INVENTOR
ATTORNEY

Patented June 30, 1931

1,812,773

UNITED STATES PATENT OFFICE

HUGH HARLEY CANNON, OF LOS ANGELES, CALIFORNIA, ASSIGNOR TO CANNON-PRUTZMAN TREATING PROCESSES, LTD., OF LOS ANGELES, CALIFORNIA, A CORPORATION OF CALIFORNIA

TAPERED TUBE FILTER PRESS

Application filed October 2, 1929. Serial No. 396,898.

My invention relates to means for filtering suspended solids from the liquids with which they are mixed, and in particular to a type of filter having foraminous tubes set in a vertical position. The suspension being forced into these tubes, the liquid constituent passes through the foraminous material thereof into a collecting chamber while the solid matter collects in the form of tubular cakes lining the foraminous tubes.

My invention particularly relates to a type of tube for use in a filter of this character, the tube characterized by having a lower end of materially greater diameter than the upper and being uniformly tapered from end to end, the object of this tapering or flaring of the tube being to permit the more ready discharge of the cake.

The objects and advantages of my invention will be evident from the following description and from the attached drawings thereof, in which.

Figure 2:
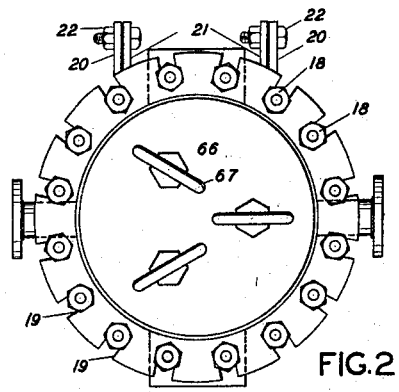
Fig. 2 is a plan view of the top of Fig. 1.

Referring to the drawings, 10 is a preferably cylindrical shell to the upper end of which is welded a flange 11 and to the lower end a projecting tube sheet 12. An upward extension 13 of this shell is welded to a tube sheet 14 and to a flange 15. Resting on this flange is a similar flange 16 welded to a domed head 17.

Flange 11 is detachably made up to tube sheet 14 by bolts 17b, and flange 15 is detachably made up to flange 16 by bolts 18, which are preferably inserted into the slots 19 shown in Fig. 2. The domed head 17 and its attached flange 16 may be swung back, out of the way of the ends of the tubes, on a pair of hinges consisting of lugs 20 attached to flange 15, lugs 21 attached to flange 16, and the pivot bolts 22 passing through each pair of lugs.

The chamber formed by tube sheet 14, shell 13 and domed head 17 is provided with two nozzles 23 and 73 provided with pipe flanges 24 and 74.

Figure 3:
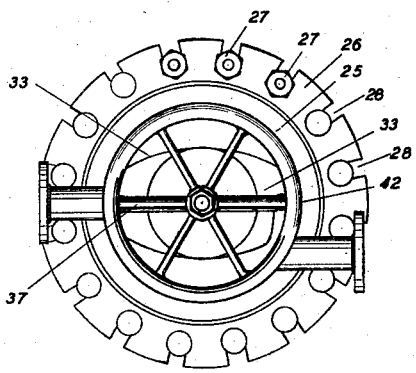
Fig. 3 is a plan view, looking upwardly, of the bottom of Fig. 1.

A downward extension 25 of shell 10 is preferably tapered, as shown, and is welded at its upper end to a flange 26 mating the projecting edge of tube sheet 12, these flanges being detachably made up by means of bolts 27 which are preferably inserted in the slots 28 shown in Fig. 3.

Extension 25 is provided with a nozzle 29 entering radially and bearing a pipe flange 30, and also with a nozzle 31 entering tangentially and bearing a pipe flange 32.

Figure 4:
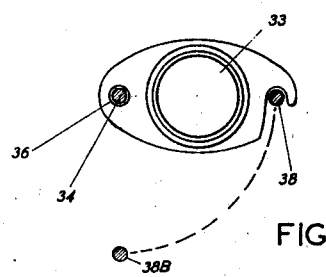
Fig. 4 is a detail of the flange 33 shown in Figs. 3 and 5.

To the bottom of extension 25 is welded a flange 33 having the irregular contour shown in Fig. 4. A heavy bolt 34 having at its upper end a fixed head 35 is loosely fitted into a hole 36 in one end of flange 33. To the lower portion of this bolt is welded a deep flat bar 37. To the opposite end of this bar is welded a similar bolt 38 having the enlarged head 39 which is supported in the hook-slot at the opposite end of flange 33.

In a suitable enlargement of the central portion of bar 37 is formed a square thread fitting a corresponding thread on a temper screw 41. To the lower end of this screw a hand wheel 42 is firmly attached by the hub 43 and nut 44. A disc 45 is loosely attached to the upper end of this screw by means of a socket 46 and a retaining screw 47. On the upper face of disc 45 and near its outer edge is formed a rib 48 fitting a corresponding groove in flange 33, soft packing not shown being placed in this groove.

When the temper screw 41 is advanced disc 45 closes the lower opening 49 of extension 25, bolt 38 then being in the position in the hook-slot shown at 38 in Fig. 4. On backing off the screw and swinging bolt 38 to the position indicated at 38B, cross-bar 37 and disc 45 are swung clear of opening 49 which is thus left unobstructed for the free passage of solid materials.

Figure 1:
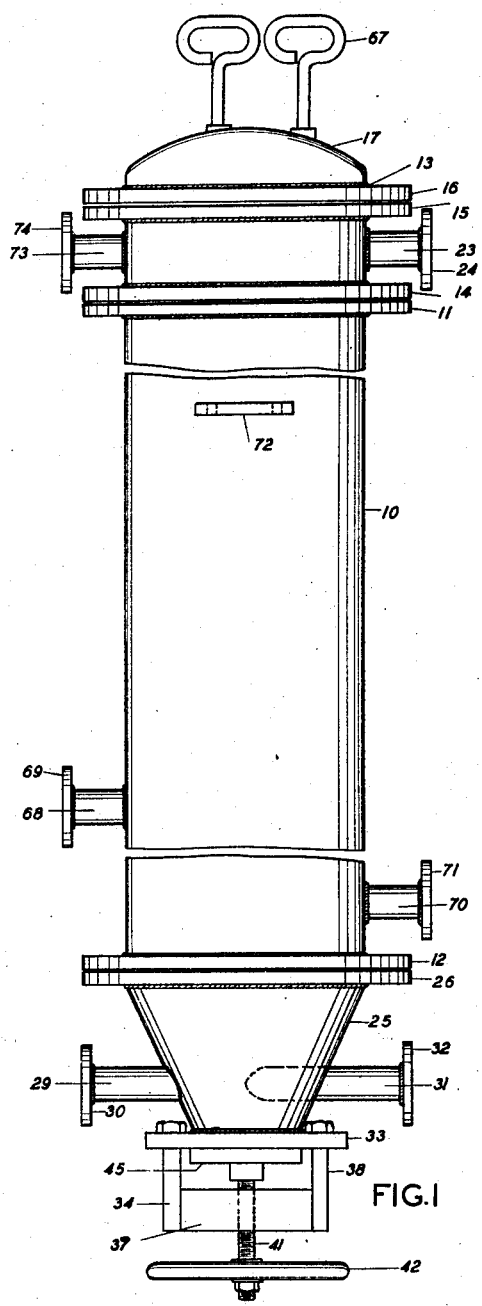
Fig. 1 shows a complete filter in vertical elevation.

The filtering element or tube indicated at 51 in Fig. 1 consists of two essential parts; an inner tube of foraminous material, such as the cotton, wool or metal cloth indicated at 52, and an outer supporting element 53 to prevent the cloth from bursting under internal pressure. The supporting element may be of any kind of substantially rigid perforate material, such as the stiff wire mesh indicated at 54 or a perforated or slotted metal tube. The internal wire spiral 55 may be used to hold the cloth against the supporting tubes if preferred, but is not essential nor always desirable. Various combinations of materials for use in forming up the filtering elements are known and the above description is intended to be illustrative only.

Figure 5:
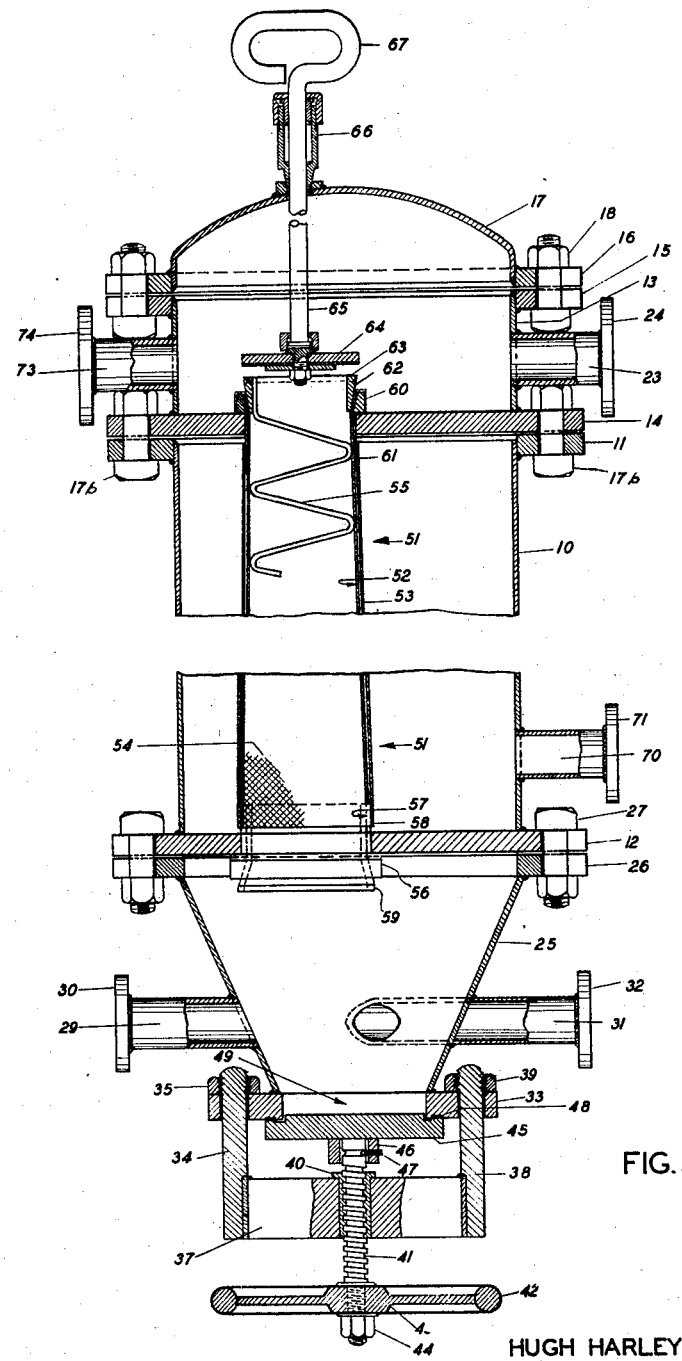
Fig. 5 is a vertical section of a filter as in Fig. 1, showing a single tube in position.

A suitable manner of supporting elements 53 from the tube sheets is shown in Fig. 5. A metallic ring or bushing 56 having an internal outward taper is inserted through tube sheet 12, this bushing projecting above the top of the tube sheet as at 57. The lower end of the supporting tube 53 is slipped over this projecting end, as at 58, and by this means is held in position.

Inside this ring is fitted a ring 59 which has an outside taper corresponding to the internal taper of ring 56. The lower end of the cloth tube 52 is brought down between these tapering surfaces, between which, on forcing the ring 59 upwardly, it is firmly and non-leakably held.

The upper end of the tube assembly is supported in a similar manner. A ring 60, having an internal upward taper, is inserted through tube sheet 14, this ring having a downward extension 61 projecting from the lower face of the tube sheet. The upper end of supporting tube 53 is slipped over this projection and is thus positioned and held.

Inside the internally tapering ring is placed a downwardly tapering ring 62 having a squared and faced upper end 63. The upper portion of cloth tube 52 is passed between these two corresponding tapers and is thus firmly and nonleakably held when the internal ring 62 is forced down.

The faced upper end 63 forms the seat for a disc 64 which is loosely mounted on a rod 65 passing through a stuffing box 66 attached to the domed head 17. This rod may be provided with a hand grip 67, by which it may be pulled up and forced down, or it may be provided with a screw thread and hand wheel in the usual manner. The seat 63 and disc 64 constitute a stop valve for closing off any desired number of tubes when a plurality of tubes is used in the assembly, and this valve with its rod and stuffing box may be omitted when a single filtering tube is used. My filter as here described may be constructed with one or any number of tubes as may be preferred.

Attention is directed to the fact that in the construction here shown the valve seats are carried on the tube sheets while the discs and rods are carried on the domed head 17. When this head is swung back to permit access to the ends of the tubes the rods and discs are simultaneously swung out of the way and the tube ends thus completely exposed.

The central shell 10 is provided with two nozzles indicated at 68 and 70 in Fig. 1, each of these nozzles bearing a pipe flange as at 69 and 71. Lugs 72 on the shell are used to support the assembly in a concrete or steel frame not shown.

It is essential to the successful application of my invention that the tube 51 be given a material taper from top to bottom. The extent or degree of this taper depends on the character of both the solid and the liquid constituent of the suspension to be filtered. Thus, if the mixture is one of gasoline with clay, a diametric difference between the lower and the upper end of one-fourth inch for each ten feet of length may be quite sufficient to cause the cake to drop out readily. A fine dense clay or diatomaceous earth in gasoline might require a taper of one inch in ten feet to secure the best results, while a mixture of clay with lubricating oil might require a taper up to or exceeding two inches per ten feet of length. I do not restrict myself to any particular taper for the filtering tube, though I would state that a taper less than one-fourth inch diameter per ten feet of length would not be material inasmuch as it would not, even under favorable conditions, produce the desired free discharge of any ordinary cake.

The filter shown in the drawings may be operated in the following manner, which I consider preferable in most cases but which is not the only possible or even desirable method of operation. In this example I assume that a material of the general nature of finely comminuted clay or earth is being filtered from a liquid of the general nature of gasoline. I also assume that the particular filter being used has a plurality of tubes except where otherwise expressly stated, and that each of the flanged nozzles is provided with a valve or other means not shown by which it may be closed off at will.

The hinged head 17 being bolted down, with the valves 64 in an open position and the tubes 51 equipped with suitable cloths, the suspension to be filtered is pumped from a supply tank through nozzle 73, all other openings except the filtrate outlet 70 being closed. The upper and lower chambers and the interiors of the tubes are thus filled with suspension. Pumping being continued, the liquid portion of the suspension passes through the foraminous walls of the filtering elements into chamber 10, from which it flows under reduced or no pressure through outlet 70 to a place of storage or disposal not shown. The solid constituent collects on the inside of the foraminous tubes, which are pressed outwardly against the supporting tubes, in the form of progressively thickening tubular cakes. If filtration be continued too long without cleaning out, this cake may be unduly difficult to dislodge, and it is preferable to clean out when the thickness of the cake is not greatly in excess of one-half the radius of the tube.

I consider it desirable to make a pipe connection from nozzle 29 to the suction of the pump supplying suspension to inlet 73, and to thus circulate through the tubes a materially greater quantity of liquid than is removed by filtration through the cloths. This circulation greatly assists in producing a cake of even thickness and thus prolongs the filtering period.

When a sufficient quantity of cake has accumulated within the tubes, openings 73 and 29 are closed and air under pressure is introduced through opening 23. There being no relief for this air except through opening 70, the oil in the tubes and finally the oil entrained in the cake will be blown through the cloth tubes into the chamber 10 and thence through outlet 70.

The press having been thus freed from oil down to the level of outlet 70, outlet 29 may be opened and the remainder of suspension pumped back to the supply tank.

Outlet 29 is now closed and the bottom opening 49 made available by retracting disc 45 and swinging bar 37 and its assembly to one side as above described. Air is then introduced under pressure into shell 10 through air inlet 68, outlet 70 being closed. Pressure is thus placed on the outside of the cloth tubes and on the cakes, which are thus slightly or entirely collapsed. By reason of the downward flare the cakes will drop freely from the cloth and, through opening 49, into a car or onto a conveyor belt or other means for removing the dry fragmental cake.

If the cakes do not drop freely from the tubes, as may sometimes occur, their movement may be accelerated by simultaneously introducing air under pressure through air inlet 23, thus applying pressure to the cakes downwardly as well as inwardly. If the filter assembly has a plurality of tubes it is desirable to close all but one of the valves 64, thus diverting the entire air stream through one tube at a time. If the assembly has but one tube the valves shown in the drawings, viz. parts 64, 65, 66 and 67 may be dispensed with.

Any failure of the cake to pass freely through the opening 49 may be corrected by simultaneously introducing air under pressure through the tangential inlet 31. The stream of air thus entering at one side of cone 25 sets up a strong whirling motion which breaks up any large pieces of cake and which also cleans accumulations of sediment from the inside of the cone itself.

When it is necessary to replace a damaged cloth, disc 45 may be retracted and bar 39 and its assembly swung out of the way as above described. The upper bolts 18 are then slackened and withdrawn radially from the slots, after which the hinged head 17 is folded back out of the way, leaving the upper ends of tubes 51 entirely clear. A heavy hook bar may then be inserted, first through the lower opening 49 and then through the open upper end, to withdraw rings 59 and 63, by which means the cloth tube is freed and may readily be withdrawn through either opening.

A new cloth tube is then put in place by drawing it through the supporting tube and is temporarily held at its upper end. The ring 59 is inserted through a projecting lower end of the cloth tube and driven upwardly until the tapers on rings 56 and 59 engage the two faces of the cloth tube and thus lock the lower end in place. The upper end of the tube is then expanded and folded back over the upper end of tapered ring 60, after which tapered ring 62 may be inserted and driven home. Care must be taken to bring the upper face of this latter ring substantially square with the axis of the tube, that it may form a proper seat for the valve disc.

To replace an outer or supporting tube and bolts 17b are slackened and removed from their slots and that portion of the assembly above flange 11 removed. The supporting tube may then be lifted off of the upwardly projecting nipple 57, a new tube put in its place, and the apparatus reassembled by the reverse of the above movements.

While I have described the above exemplification of my improved filter in considerable detail I do not limit my invention to the exact forms disclosed, but only to such structures as are described in the appended claims.

I claim as my invention:

1. In a tubular filter having a plurality of filtering tubes lined with foraminous material: a valve disc axially placed over one end of each tube, said disc cooperating with a seat adapted to retain said foraminous material in position and removably inserted in said end of said tube to close said tube against the passage of liquid therethrough.

2. In a tubular filter having a plurality of filtering tubes lined with foraminous material: a flat-faced valve disc cooperating with a flat-faced valve seat removably inserted in an end of each said tube and adapted to retain said foraminous material in position within said tube.

3. In a tubular filter having a plurality of filtering tubes mounted in parallel within a shell having heads, said tubes beink lined with foraminous material: a valve seat mounted in one end of each tube and adapted to retain said foraminous material in position; a valve disc cooperating with said seat to close said tube, and a stem attached to said disc and passing through a stuffing box in the adjacent head of said shell.

In witness that I claim the foregoing I have hereunto subscribed my name this 25th day of September, 1929.

HUGH HARLEY CANNON.